(12) United States Patent
Puertolas et al.

(10) Patent No.: US 11,958,607 B2
(45) Date of Patent: Apr. 16, 2024

(54) SUPPORT FOR CONNECTING A SEAT TO A COMMUNICATION NETWORK

(71) Applicant: LATELEC, Toulouse (FR)

(72) Inventors: Bastien Puertolas, Aigrefeuille (FR); Jérémy Pisanu, Colomiers (FR)

(73) Assignee: LATELEC, Toulouse (FR)

( * ) Notice: Subject to any disclaimer, the term of this patent is extended or adjusted under 35 U.S.C. 154(b) by 324 days.

(21) Appl. No.: 17/616,622

(22) PCT Filed: Jun. 10, 2020

(86) PCT No.: PCT/EP2020/066037
§ 371 (c)(1),
(2) Date: Dec. 3, 2021

(87) PCT Pub. No.: WO2020/249592
PCT Pub. Date: Dec. 17, 2020

(65) Prior Publication Data
US 2022/0227492 A1 Jul. 21, 2022

(30) Foreign Application Priority Data
Jun. 14, 2019 (FR) ..................................... 1906362

(51) Int. Cl.
*G06F 3/038* (2013.01)
*B64D 11/00* (2006.01)

(52) U.S. Cl.
CPC .............................. *B64D 11/00151* (2014.12)

(58) Field of Classification Search
CPC .................................................. B64D 11/00151

USPC ......................................................... 345/204
See application file for complete search history.

(56) References Cited

U.S. PATENT DOCUMENTS

| | | | |
|---|---|---|---|
| 6,120,155 A * | 9/2000 | Brennan | B60R 1/008 359/872 |
| 2005/0011920 A1 * | 1/2005 | Feng | B60R 11/0252 224/929 |
| 2005/0132407 A1 * | 6/2005 | Boyer, Jr. | B64D 11/00155 348/E7.071 |
| 2006/0032996 A1 * | 2/2006 | Wu | B60N 3/004 248/218.4 |
| 2014/0226983 A1 * | 8/2014 | Vargas | H04N 21/41422 398/66 |
| 2016/0176357 A1 | 6/2016 | Maslakow | |
| 2017/0282850 A1 * | 10/2017 | Friedman | A61F 9/04 |

* cited by examiner

*Primary Examiner* — Jonathan M Blancha
(74) *Attorney, Agent, or Firm* — H&I PARTNERS; Chai Im; C. Andrew Im (57) ABSTRACT

A support configured to be reversibly installed on an upper part of an uncovered backrest of a seat. The support includes a plate configured to bear, completely or partly, against a rear face of the backrest, three clamping mechanisms, a Li-Fi technology data communicator connected to the plate, and a connector. Each clamping mechanism includes a bearing member and a clamping screw that are configured to cooperate with the plate so as to clamp a structural frame of the backrest between the bearing member and the plate. The connector being connected to the data communicator by a cable and being connectable an electronic equipment item.

11 Claims, 5 Drawing Sheets

SUPPORT FOR CONNECTING A SEAT TO A COMMUNICATION NETWORK

RELATED APPLICATIONS

This application is a § 371 application of PCT/EP2020/066037 filed Jun. 10, 2020, which claims priority from French Patent Application No. 19 06362 filed Jun. 14, 2019, each of which is incorporated herein by reference in its entirety.

TECHNICAL FIELD OF THE INVENTION

The invention relates to a support for reversibly equipping a seat with a connectivity system. In particular, the invention is intended for an application in the aeronautic field, to equip an aircraft.

BACKGROUND OF THE INVENTION

Conventional cabins of aircrafts, in particular those of long-haul aircrafts, are equipped with onboard entertainment systems (called IFE systems), such as screens, generally placed at the passenger seats, to offer to each passenger, a limited access to media, such as films, proposed by the airline company operating the aircraft.

In general, aircraft seats equipped with the onboard entertainment system integrate a video screen and an audio interface, and should consequently be connected by wiring to central processing units. Therefore, they are heavier and more complex to make than conventional seats, without onboard entertainment systems. In addition, the weight of the wiring and of the associated connectors significantly alters the mass balance of the aircraft. Finally, as technology progresses rapidly, the screens become quickly obsolete.

These cabins are sometimes equipped with a Wi-Fi® (acronym for Wireless Fidelity) type communication network to offer an Internet connection to the mobile electronic equipment (computer, phone, tablet, etc.) of the passengers. Yet, Wi-Fi has many drawbacks, inter alia, the use of Wi-Fi could cause interferences with other apparatuses present in the aircraft, or raise public health issues regarding risks related to a prolonged exposure to electromagnetic radiations.

In turn, some short-haul aircraft cabins are not provided with such onboard entertainment systems and do not necessarily provide an Internet connection. One of the main reasons relates to the impact on the mass balance of the aircraft. Another reason is that the flight is generally too short for a passenger being able for example to watch an entire film.

Yet, passengers are increasingly equipped with electronic equipment. There is an increasing need expressed by passengers to have the possibility to access the communication network of the aircraft and/or to the onboard entertainment system, even on short-haul flights.

OBJECT AND SUMMARY OF THE INVENTION

The present invention aims to overcome the aforementioned drawbacks.

In particular, the present invention aims to provide passengers with a connection to the services of the company and to the Internet without resorting to Wi-Fi and without deploying the installation of a dedicated seat.

To this end, the present invention proposes a support intended to be reversibly installed at an upper part of an uncovered backrest of a seat. The support comprising:
- a plate, intended to bear, totally or partially, against a rear face of the backrest,
- three clamping mechanisms, each clamping mechanism comprising a bearing member and a clamping screw that are intended to cooperate with the plate so as to be able to clamp a structural framework of the backrest between said bearing member and said plate,
- a data communication device according to the Li-Fi technology connected to the plate,
- a connector intended for the connection of an electronic equipment, said connector being connected to the data communication device by a cable.

The rotation of the clamping screws in either direction allows bringing the associated clamping members of the plate close to or away from each other so as to sandwich the structural framework of the backrest, thereby clamping or releasing the support off the structural framework of the backrest.

Advantageously, the clamping mechanisms are arranged on the support so as to suppress all degrees of freedom between the support and the structural framework. Thus, the clamping mechanisms allow ensuring a rigid hold of the support on the backrest, without degrading it.

Such a support allows adding accessories to a seat, without modifying it (no screwing, no gluing on the backrest itself). Thus, the support could be installed on or removed off the seat depending on need.

The installation or the removal of such a support on the seat could be carried out quickly, without the need for specific tools. A screwdriver, for example, is enough.

The support is provided with a data communication device configured and oriented to enable a bidirectional communication with a remote communication device placed in an environment close to the seat equipped with the support.

Li-Fi (acronym for Light Fidelity) is a wireless communication technology based on the use of light in the visible domain (wavelength comprised between 400 nm and 780 nm) or the infrared domain (wavelength comprised between 780 nm and 2 μm) as an information vector.

The principle of Li-Fi is based on encoding and sending of data via an amplitude, frequency or phase modulation of a light source, according to a standardized protocol.

The Li-Fi technology allows getting rid of the problems of installation complexity and wiring weight, but also of the constraints related to data security, electromagnetic pollution encountered with Wi-Fi and its problems with regards to health.

Through this data communication device, the support provides access to an internet communication network by the Li-Fi technology.

The support allows connecting various types of electronic equipment, such as a screen, a tablet, a laptop. The electronic equipment connected to the support, and to the data communication device, via the connector.

Advantageously, the support according to the invention is standalone. No wiring is necessary. Indeed, the battery of the electronic equipment could power, alone, the data communication device.

Preferably, the support is intended for the aeronautic field, to equip an aircraft passenger seat, but could also be intended to any other field, such as the railway field or the automotive field, without this list being exhaustive, to equip passenger seats.

In particular embodiments, the invention further encompasses the following features, implemented separately or in each of their technically-feasible combinations.

In particular embodiments of the invention, the bearing member of at least one clamping mechanism is in the form of a longitudinal leg having, at a so-called free end, a hook-like shape.

Preferably, all bearing members are in the form of a longitudinal leg having a hook-like shape at a free end.

Such a hook-like shape is advantageous, when the structural framework is in the form of a peripheral frame in the form of a tube. In this configuration, the hook cooperates with the tube, by fitting around said tube, thereby improving the blockage of the support on the backrest.

In particular embodiments of the invention, the plate comprises an opening intended for the reception of the electronic equipment.

In some embodiments, the plate comprises elements for reversible holding of the electronic equipment in the opening of the plate.

In particular embodiments of the invention, the support comprises, within a thickness of the plate, a chimney extending from the opening towards a periphery of the plate. Advantageously, such a chimney allows ensuring the circulation of air and an evacuation of hot air out of the support, when a piece of equipment is placed in the opening of the plate.

In particular embodiments of the invention, the communication device comprises an emitter and a receiver disposed in a protective case, the protective case comprising a glazed portion opposite the emitter and the receiver. Such a glazed portion does not hinder the transmission/reception of the optical signals originating from the data communication device or from the remote communication device.

In some embodiments, the protective case is secured to the plate by a ball joint connection.

By "secured", when referring to parts with respect to each other in a manner conventional per se, it should be understood that said parts are mutually linked, a relative movement between these could nonetheless be possible.

In the present description, by convention, by "secured", reference is made to parts being linked to each other by a connection enabling a relative movement of one part relative to another. By "fixedly secured", reference is made to parts that are mutually linked in a fixed manner, i.e. so that a relative movement between these is impossible.

Advantageously, the ball joint connection allows orienting the protective case so as to align the data communication device of the support with the remote communication device.

In particular embodiments of the invention, the support comprises a casing for receiving the protective case, said casing being fixedly secured to the plate. Advantageously, such a casing allows protecting the positioning of the protective case to hold its orientation.

In particular embodiments of the invention, the support comprises two reversible fastening elements, each fastening element linking a lower part of the plate to the free end of a longitudinal leg.

The invention also relates to a seat comprising a backrest equipped with a support as defined hereinabove in one of its embodiments. The seat further comprises a padding block and a slipcover covering the padding block and the support. The slipcover comprises a glazed area, preferably arranged opposite the glazed portion of the protective case in order not to hinder the transmission/reception of the optical signals originating from the data communication device or from the remote communication device.

BRIEF DESCRIPTION OF THE FIGURES

The invention will be better understood upon reading the following description, provided as a non-limiting example, and made with reference to the following figures.

In these figures, reference numerals that are identical from one figure to another designate identical or similar elements. Moreover, for clarity purposes, the drawings are not to scale, unless stated otherwise.

DETAILED DESCRIPTION OF THE EMBODIMENTS

A support 10, as illustrated in FIGS. 1 to 10, is intended to be reversibly installed on a seat 50. Such a support 10 allows equipping a seat with a connectivity system allowing access to entertainment data and/or internet data.

In general, the support 10 could equip seats of any means of transport, in particular those of the aeronautic, railroad and automotive industries, without this restricting the invention. Thus, it is also possible to equip seats installed in public places with the support.

The invention is described in the particular context of one of its preferred fields of application wherein the support is intended to be installed on a seat disposed in a passenger cabin of an airliner. However, nothing precludes from disposing the support on a passenger seat of any other type of aircraft, whether civilian or military.

Figure 1:
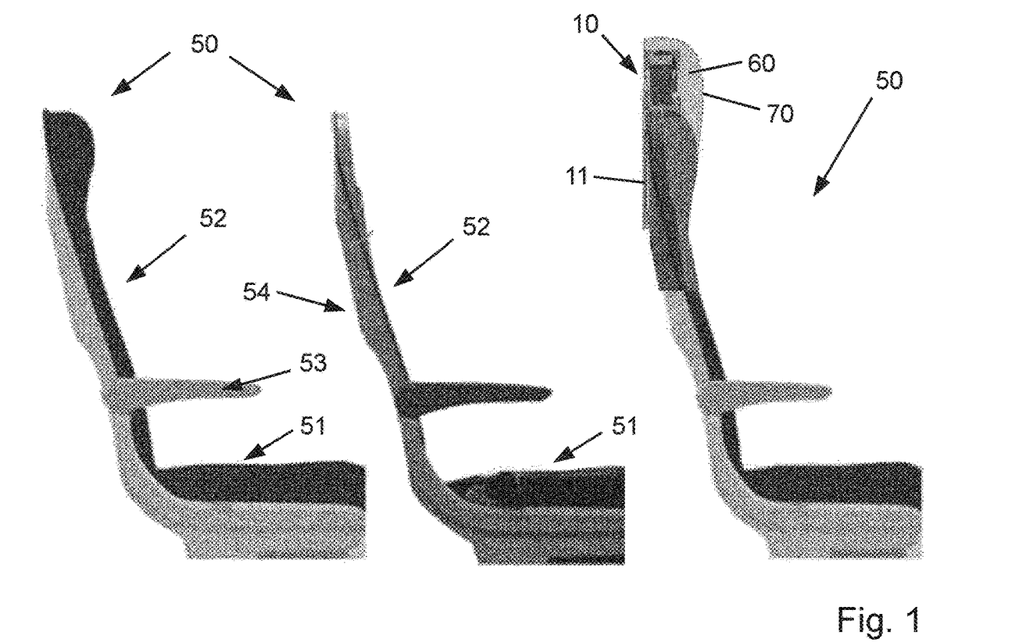
FIG. 1 represents three seats disposed behind each other, the seat the farthest to the right comprising an example of the support according to the invention, the seat the farthest to the left is a standard seat before installation of a support according to the invention, and the seat at the middle is an uncovered standard seat with its structure exposed and ready to receive a support according to the invention.

FIG. 1 illustrates three passenger seats 50 of an aircraft, of the economy class type, disposed behind each other.

Conventionally, a seat 50 comprises a sitting portion 51 and a backrest 52. Preferably, the backrest 52 is linked to the sitting portion 51. Preferably, the backrest 52 comprises a structural framework 55 that is covered with a padding block and with a slipcover to comfortably receive the back of the passenger.

The backrest 52 of the seat located the farthest to the left in FIG. 1 comprises the padding block and the slipcover. In turn, the backrest 52 of the seat located at the centre of FIG. 1 is uncovered.

In the following description, by uncovered backrest, it should be understood a backrest from which the padding block and the slipcover have been removed.

The backrest 52 of the seat 50 located the farthest to the right in FIG. 1 is equipped with the removable support 10, and covered with suitable padding block 60 and slipcover 70, as it will be explained later on.

The seat 50 may comprise armrests 53, as illustrated in a non-limiting manner in FIG. 1.

The backrest 52 of the seat comprises a front face 521 intended to lie on the side of the passenger sitting on the seat and a rear face 522 intended to be opposite the passenger located on the rear seat. A trim shell 54, generally made of plastic, of the seat 50 could be disposed at the rear face 522 of the backrest 52, against the structural framework 55. Such a trim shell 54 could support a storage space or a cup-holder.

Figure 4:
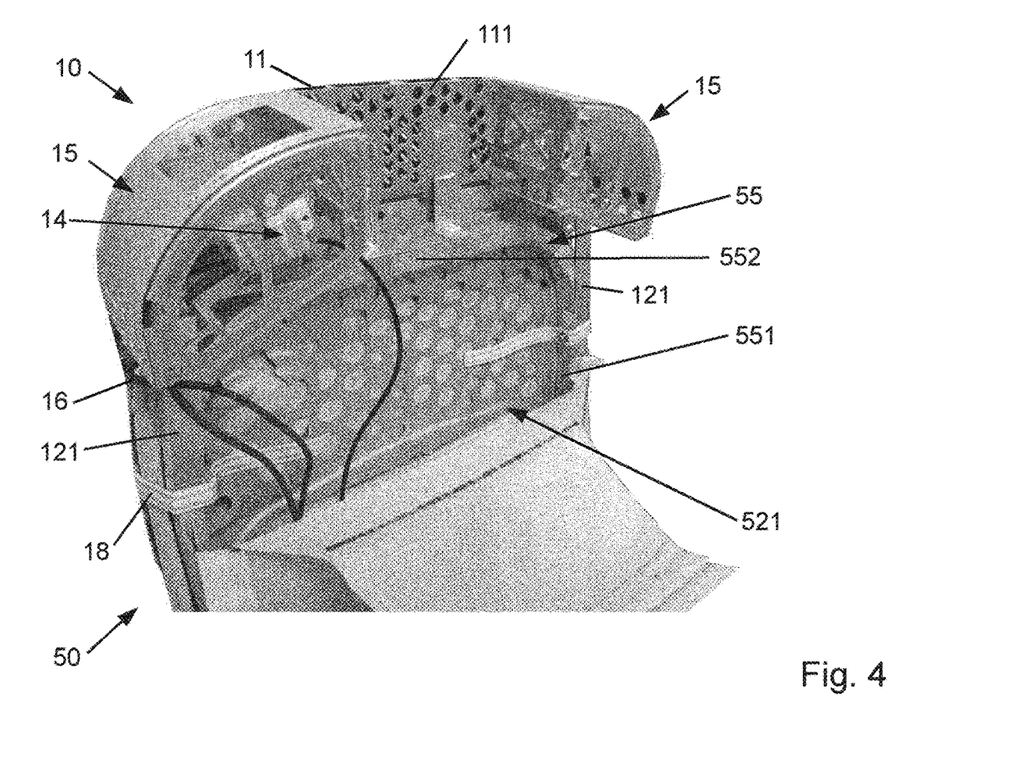
FIG. 4 represents a photograph of the plate and of the clamping mechanisms of the support of FIG. 3 installed on an upper part of an uncovered seat.
Figure 5:
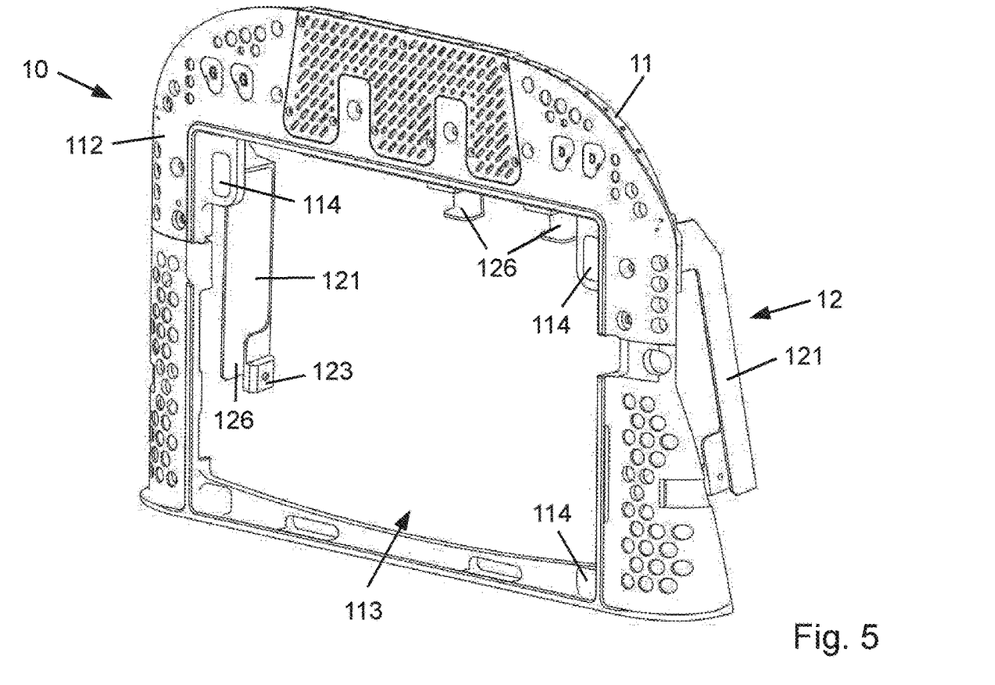
FIG. 5 represents, a rear perspective view of a plate and of the clamping mechanisms of an example of the support according to the invention.
Figure 6:
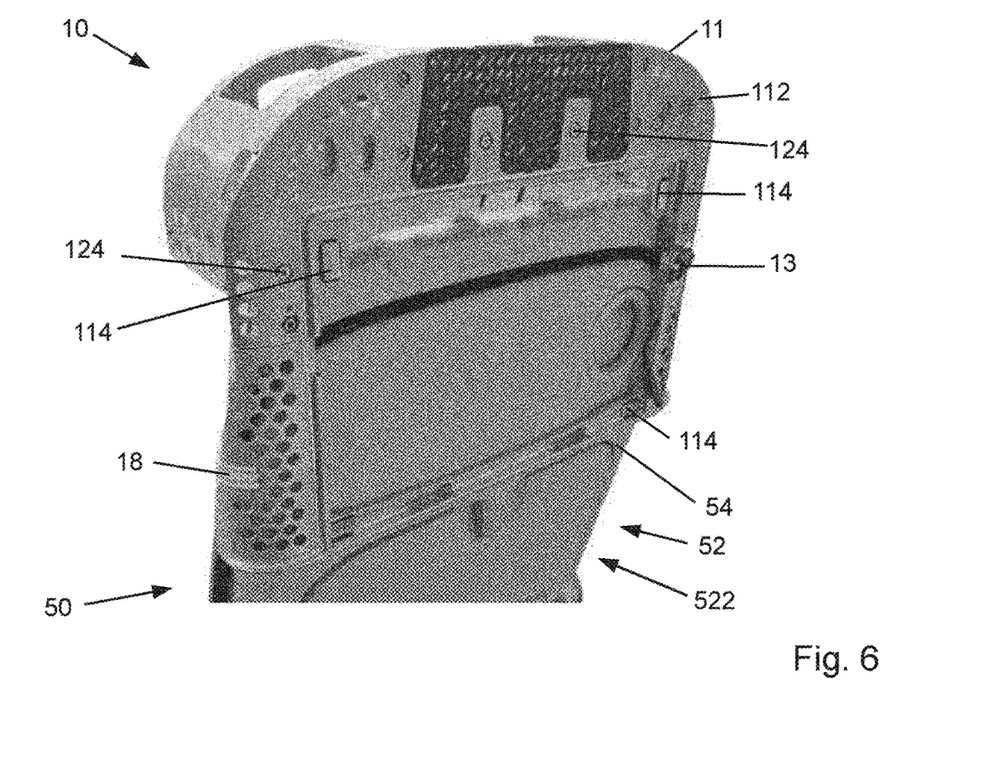
FIG. 6 represents a photograph of the plate and of the clamping mechanisms of the support of FIG. 5 installed on an upper part of an uncovered seat.

In the non-limiting example of FIG. 4, the structural framework 55 is in the form of a peripheral frame. The peripheral frame comprises two lateral portions 551, defining lateral edges of the backrest 52 and an upper portion 552, defining an upper part 523 of the backrest 52.

For example, the peripheral frame is formed by a bent tube with a square section.

The support 10 is intended to be reversibly installed on the upper part 523 of the backrest 52 uncovered beforehand.

The support 10 as described advantageously allows equipping a seat 50 enabling the passenger located behind said seat to have access to entertainment data and/or internet data.

Thus, as illustrated in FIG. 1, the support 10 placed on the seat the farthest to the right in FIG. 1 allows the passenger sitting on the seat located at the center in FIG. 1 to access the entertainment data and/or internet data.

The support 10 is intended and adapted to communicate with electronic equipment 90. For example, a piece of electronic equipment 90 may be a laptop, or any other electronic apparatus, such as a tablet or a mobile phone. The electronic equipment may be an apparatus proposed by the airline company operating the aircraft or else be an apparatus belonging to the passenger. The support 10 primarily comprises a plate 11. Said plate is intended to bear, totally or partially, against the rear face 522 of the uncovered backrest 52. Said plate bears at least at the upper part 523 of the backrest, as illustrated in FIGS. 4, 6 to 8.

In the non-limiting example of these figures, said plate extends beyond the upper part 523 of the backrest. The plate 11 lies in the continuation of the rear face 522 of the backrest 52.

In the non-limiting example, the plate 11 bears against the plastic shell 54 of the backrest 52. Thus, the plastic shell is interposed between the plate 11 and the structural framework 55 of the backrest.

The plate 11 comprises a front face 111 and a rear face 112. The front face 111 of the plate 11 bears against the rear face 522 of the backrest 52.

The plate 11 is shaped so as to match with the shape of the rear face 522 of the backrest 52, at its upper part 523. The plate 11 is also shaped so as to have a shape substantially equivalent to the shape of the upper part 523 of the backrest, to preserve a visual harmony in the cabin, once the seat is covered again.

The support 10 further comprises at least three clamping mechanisms 12.

Advantageously, each clamping mechanism 12 is intended to cooperate with the plate 11 to clamp the structural framework 55 of the backrest 52 to hold the support 10 on the backrest 52 fixedly and rigidly, yet not permanently.

Preferably, the clamping mechanisms 12 are arranged on the support 10 so that, when said support is fastened to the structural framework 55 of the backrest, all degrees of freedom (rotations, translations) between the support 11 and the structural framework 55 are suppressed. Thus, such clamping mechanisms 12 advantageously allow ensuring a tight hold of the support 11 on the backrest 52 of the seat.

In the example illustrated in FIGS. 2-5, 7 and 8, the support 10 comprises four clamping mechanisms 12:
two clamping mechanisms 12 configured so as to bear against the upper portion 552 of the peripheral frame belonging to the structural framework 55,
two clamping mechanisms each configured so as to bear against a lateral portion 551 of the peripheral frame belonging to the structural framework 55.

Although the clamping mechanisms 12 are illustrated in the figures and described four in number, the number of these clamping mechanisms is not limited to that described and illustrated. Thus, without departing from the scope of the invention, it is possible to make a support with three, five clamping mechanisms or more.

Thus, it is possible to consider that the support 10 comprises only one suitably-sized clamping mechanism 12, disposed so as to bear against the upper portion 552 of the peripheral frame, instead of the two illustrated in the figures.

As illustrated in FIGS. 2-5, 7 and 8, a clamping mechanism 12 preferably comprises a bearing member 121 and a clamping screw 124 intended to cooperate with the plate 11 to clamp the structural framework 55 of the backrest 52 between said bearing member and said plate.

The rotation of the clamping screw 124 of a clamping mechanism 12 in one direction advantageously allows bringing the bearing member 121 close to the plate 11. The rotation of the clamping screw 124 in the other direction allows bringing the bearing member 121 away from the plate 11.

Thus, when the support 10 is disposed at the upper part 523 of the backrest 52, the rotation of the clamping screw 124 of a clamping mechanism 12 in one direction allows bringing the bearing member 121 close to the plate 11 so as to sandwich the structural framework 55 of the backrest, thereby clamping the support 10 to the structural framework. The rotation of the clamping screw 12 in the other direction allows bringing the bearing member 121 away from the plate 11 so as to release said support off the structural framework 55 of the backrest, to remove it.

In another embodiment, when the support 10 is disposed at the upper part 523 of the backrest 52, the clamping screw 124 is screwed until abutment. Holding of the plate 11 on the structural framework 55 of the backrest is ensured by the elasticity of the bearing member 121 of the clamping mechanism 12, while avoiding any clamping error.

Figure 2:
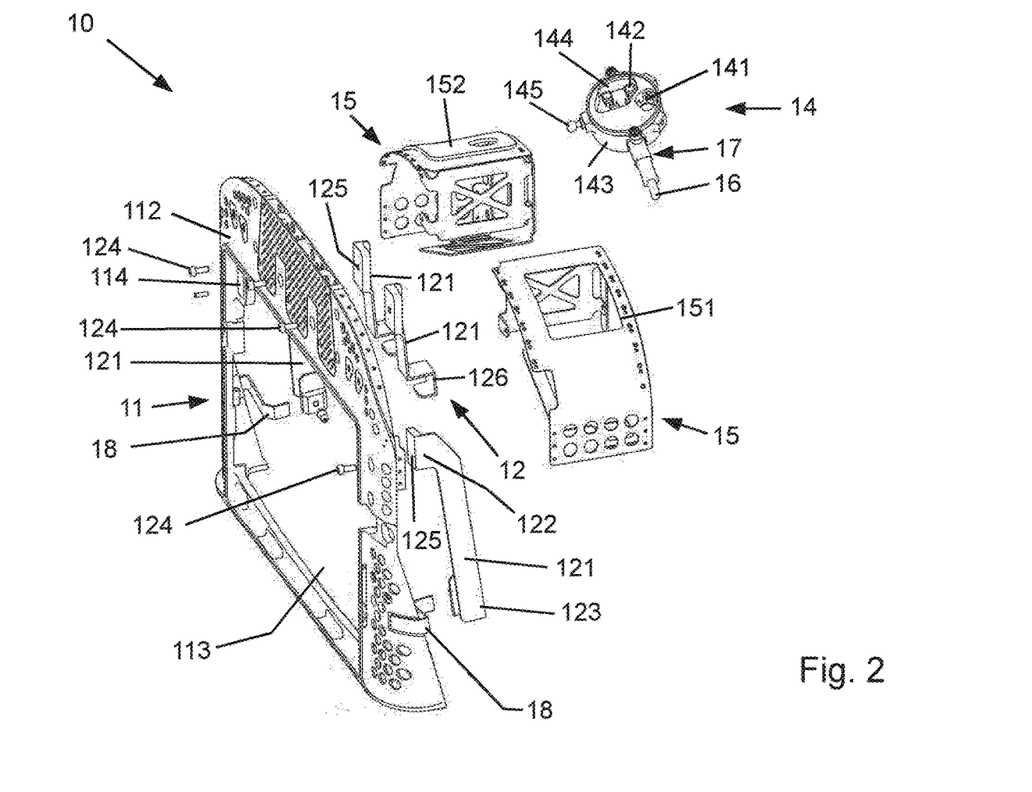
FIG. 2 represents an exploded view of the constitutive elements of an example of a support according to the invention.
Figure 3:
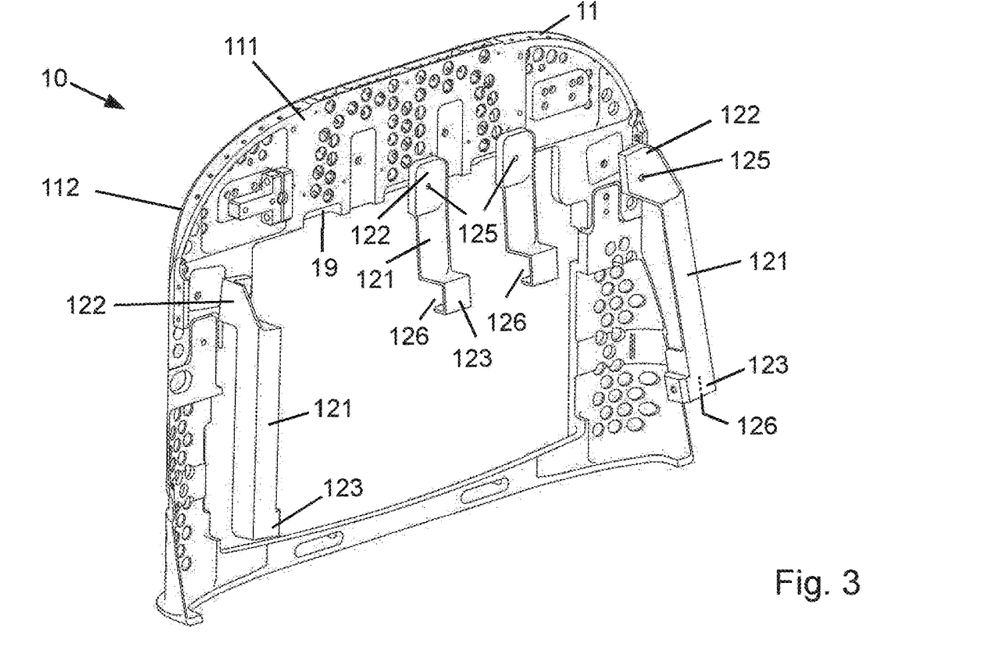
FIG. 3 represents an exploded front perspective view of a plate and of the clamping mechanisms of an example of a support according to the invention.

In one embodiment, illustrated in FIGS. 2 to 4, a bearing member 121 may be in the form of a longitudinal leg. The longitudinal leg comprises a first end 122 linked to the plate 11. The first end 122 comprises a threaded hole 125. Preferably, the plate comprises a hole for the passage of the screw, for example a counterbore-type one, opposite the threaded hole of the longitudinal leg. The longitudinal leg is fastened to the plate 11 by setting up the clamping screw 124 into the passage hole of the plate 11 and then by screwing the clamping screw in the threaded hole of the longitudinal leg.

The longitudinal leg comprises a second end 123, called free end, intended to come into contact with the structural framework 55.

In an embodiment of the longitudinal leg, in the case where the structural framework 55 is in the form of a tubular peripheral frame, the free end 123 of the longitudinal leg has a hook-like shape 126 with a shape complementary to the section of the tubular peripheral frame such that, when the rotation of the clamping screw 124 brings the longitudinal leg close to the plate 11, the hook 126 cooperates with said tubular peripheral frame, while fitting around said peripheral frame, thereby improving the blockage of the rotation and translation of the support 10 on the structural framework 55.

Advantageously, a support 10 with such clamping mechanisms 12 enables an installation of said support on the backrest 52 without deteriorating it. No fastening by screwing or gluing on the backrest itself is necessary. The support 10 could be removed easily also without degradation, by simple release of the clamping screws 124 of the clamping mechanisms 12. Thus, the structure of the seat 50 is preserved. No modification of the seat is necessary. Consequently, there is thus no need for certifying a new seat.

The support 10 further comprises a connector 13 to connect a piece of electronic equipment 90 thereto.

For example, yet without limitation, the connector 13 may be a USB (acronym for Universal Serial Bus) connector. It is clear that any other connector type could be used, for example a type-C USB connector, an RJ 45 connector.

Preferably, the connector 13 is accessible from the rear face 112 of the plate 11.

Figure 7:
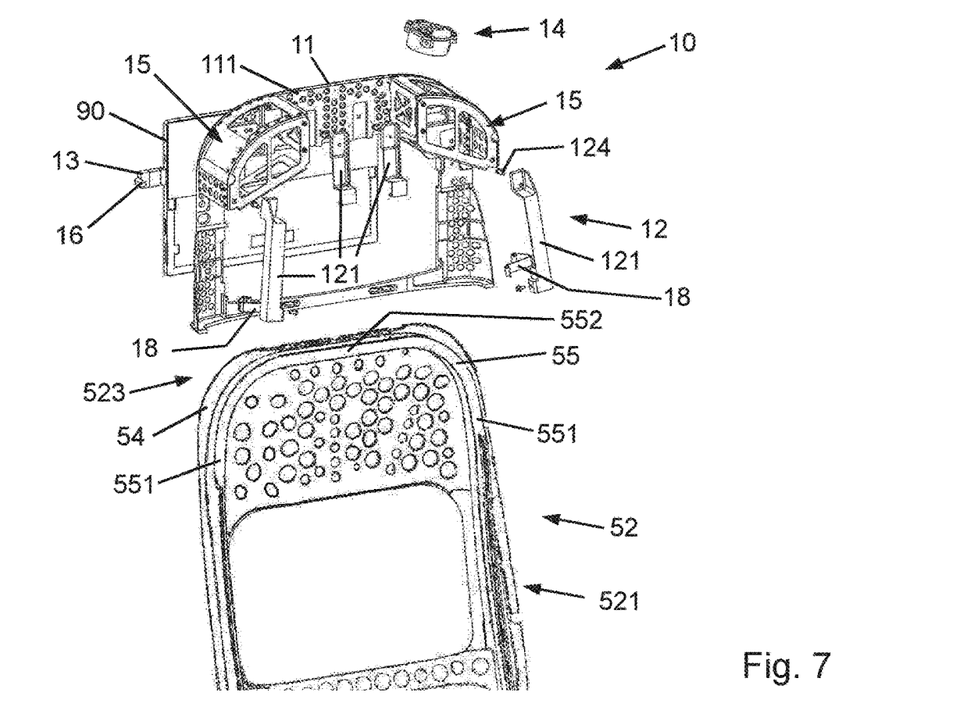
FIG. 7 represents, a (partial) exploded front perspective view of an example of the support according to the invention.
Figure 10:
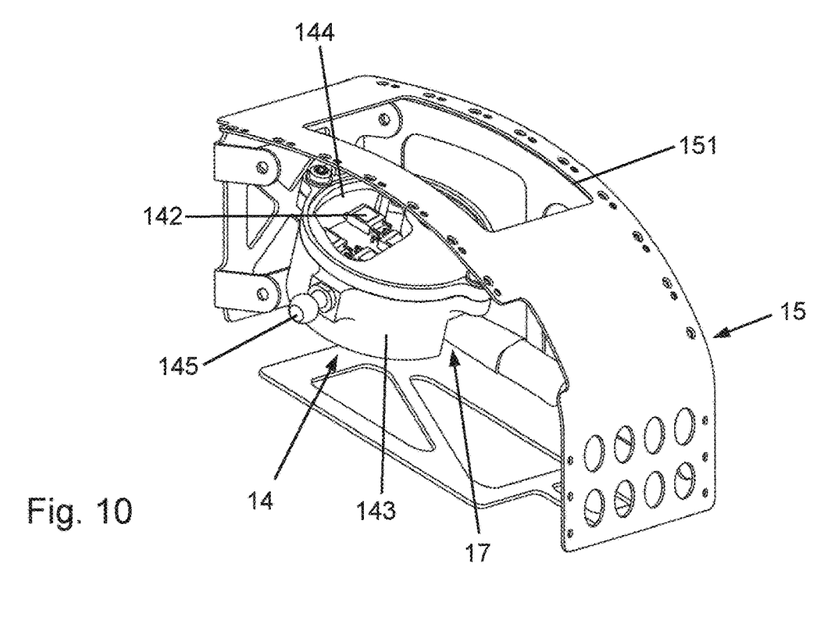
FIG. 10 represents a perspective detail view of an example of a communication device placed in a casing of the support.

The support 10 further comprises a data communication device according to the Li-Fi technology, called communication device 14, as illustrated in FIGS. 2, 7 and 10.

The communication device 14 of the support is configured to be connected to a piece of electronic equipment 90, as it will be explained later on.

The communication device 14 of the support is intended to be associated to an adequate communication device disposed in the aircraft, called remote communication device (not represented in the figures). In particular, the remote communication device is connected with central processing units of the onboard multimedia systems (IFE). Preferably, the remote communication device is disposed in a ceiling of the aircraft.

Advantageously, the communication device 14 of the support and the remote communication device enable the establishment of a bidirectional data communication, i.e.:
in the so-called downlink communication direction, a transmission of the entertainment data and/or of the internet data towards the equipment,
in the so-called uplink communication direction, a transmission of the entertainment data and/or of the internet data from the equipment.

In a manner known per se, the communication device 14 of the support comprises an emitter 141 and a receiver 142. Said emitter is configured to emit a specific signal to a receiver disposed in the remote communication device. The receiver 142 of said communication device 14 of the support is configured to receive a specific signal originating from an emitter disposed in the remote communication device.

More specifically, the communication device comprises, as an emitter 14, a light source adapted to emit, preferably in the infrared domain, a Li-Fi type modulated optical signal, called first signal.

In a non-limiting embodiment, this modulation of the optical signal is obtained by controlling the intensity of the light source in a variable manner at a very high frequency.

For example, the light source is a light-emitting diode (LED) or a laser.

The communication device comprises, as a receiver 142, a module for acquiring a Li-Fi type modulated optical signal, called second signal, originating from the emitter of the remote communication device.

Said acquisition module of the communication device 14 of the support is adapted to detect the variations of intensity of the second signal. The acquisition module converts the data on the variations of intensity of the optical signal into a digital signal for the equipment.

In one embodiment, the acquisition module is a photodiode.

Preferably, the emitter 141 and the receiver 142 of the communication device 14 of the support are disposed in a protective case 143. Preferably, said protective case comprises a transparent glazed portion 144, opposite the emitter 141 and the receiver 142, in order not to hinder the transmission/reception of the first and second signals.

Preferably, the protective case 143 is secured to the front face 111 of the plate 11.

In a preferred embodiment, the protective case 143 is secured to the front face 111 of the plate 11 by a ball joint connection 145. It should be recalled that a ball-joint connection links the plate 11 and the protective case 143 in translation but leaves them free in rotation. Such a ball-joint connection allows setting the orientation of the protective case 143, and therefore of the communication device 14 of the support, with respect to the remote communication device depending on its location. The protective case 143 is oriented so that the transmission/reception of the first and second signals between the two communication devices could be achieved.

In one embodiment, to adapt to the luminous flux of the remote communication device, the communication device may comprise at least one lens arranged on an optical axis of its emitter 141, and at least one lens arranged on an optical axis of its receiver 142. For example, these lenses are installed instead of the glazed portion 144 of the communication device 14. These lenses could also be installed, in the communication device, between the emitter and/or the receiver and the glazed portion, and in cooperation with said glazed portion 144.

Preferably, the protective case 143 is disposed in a casing 15 fixedly secured to the front face 111 of the plate 11.

Preferably, the casing 15 defines a hollow volume configured to receive the case of the communication device.

Advantageously, such a casing 15 allows protecting the protective case 143 and therefore holding the positioning imparted to the protective case. It allows avoiding a disruption of the orientation of the protective case.

Figure 8:
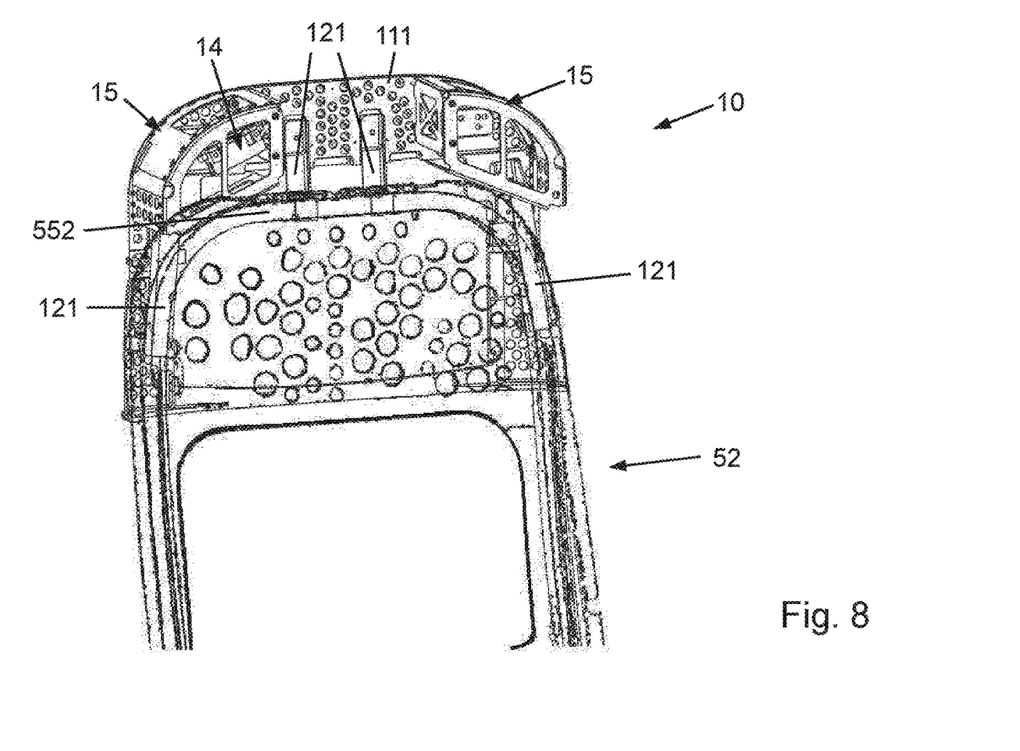
FIG. 8 represents a front view of an example of the support installed on an upper part of an uncovered seat.
Figure 9:
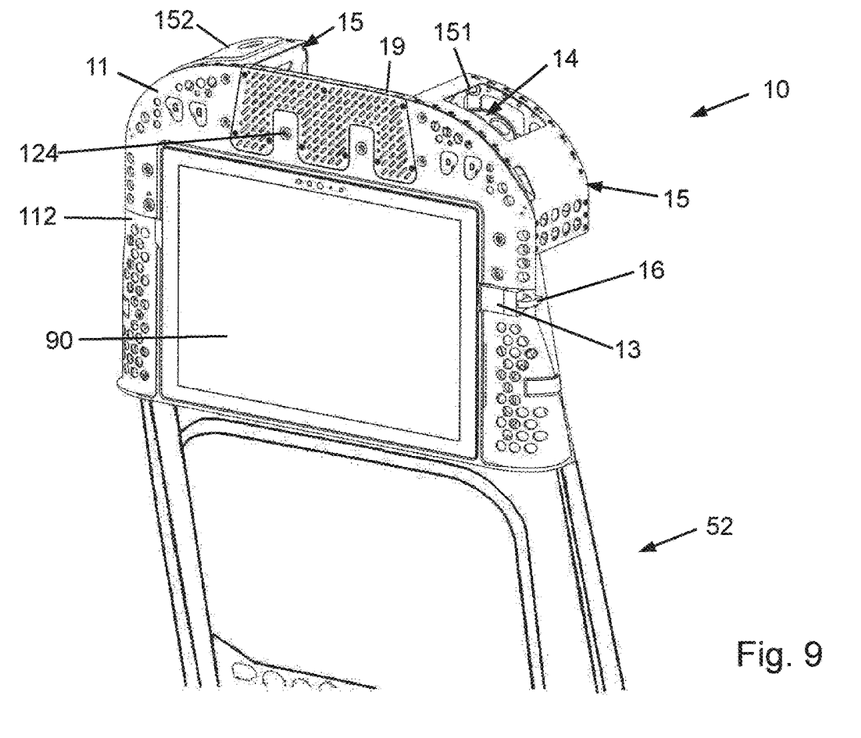
FIG. 9 represents, a rear perspective view of an example of the support installed on an upper part of an uncovered seat, which support is equipped with a tablet.

In a preferred example, illustrated in FIGS. 7 to 9, in order to limit the bulk of the support 10 in thickness, the casing 15 is disposed above the upper part 523 of the backrest 52 of the seat.

Preferably, the casing 15 comprises at least one opening 151, whether glazed or not, opposite the transparent glazed portion 144 of the protective case 143, in order not to hinder the transmission/reception of the first and second signals between the two communication devices.

Said opening of the casing 15 is disposed opposite the remote communication device. In the example where the remote communication device is arranged in the floor of the aircraft, said opening faces the floor, on an upper part of the casing, as illustrated in FIGS. 7 to 10.

The casing 15 may be made integral with the plate 11 or be a part attached and fixedly secured on the plate 11, for example by means of screws.

In a preferred embodiment, and as illustrated in FIGS. 7 to 9, the support 10 comprises two casings 15, disposed symmetrically on the plate 11, disposed above the upper part 523 of the backrest 52 of the seat. The two casings 15 have an external shape with a curvature substantially similar to the curvature of a portion of an upper part of the plate.

In such a configuration, the support 10 comprises one single communication device 14, which will be disposed in one amongst the two casings. In this configuration, for the casing that does not receive the communication device 14, a closure plate 152 is disposed so as to cover the opening 151 of said casing, as illustrated in FIG. 2.

The choice of the positioning of the communication device 14 of the support in either one of the casings 15 depends on the positioning of the remote communication device. Thus, for illustration, when the remote communication device is disposed in the ceiling of the aircraft, at the aisle, the seats disposed on the side of the left wing of the aircraft comprise a support 10 with a communication device 14 preferably disposed in the right-side casing 15 of the support (i.e. the casing located on the aisle side). The seats disposed on the side of the right wing of the aircraft comprise a support 10 with a communication device 14 preferably disposed in the left-side casing of said support (i.e., the casing located on the aisle side).

It could also be considered to equip the support 10 with a communication device 14 in each casing 15. In this case, only one communication device 14 will be connected to the connector 13.

In another embodiment, the support 10 may comprise one single casing 15, disposed above the upper part 523 of the backrest 52 and which has an external shape with a curvature substantially similar to the curvature of an upper part of the plate 11.

Advantageously, the communication device 14 is connected to the connector 13 via a cable 16. In the illustrated example, the cable 16 runs along the structural framework 55 of the backrest. When the backrest will be covered again, the cable will be invisible. In another embodiment, the cable 16 may have a visible portion protruding out of the rear face 112 of the plate 11 and of the support 10, and terminating, at one end, called first end, by the connector 13.

Preferably, the cable 13 is connected to the protective case 143 by complementary connection means 17, such as a USB port on the protective case 14 and a USB connector to a second end of the cable 16, or vice versa. Of course, the invention is not limited to USB connection means but could comprise other complementary connection means without departing from the scope of the invention.

In one embodiment, the plate 11 of the support 10 comprises, at its rear face 112, an opening 113 configured to receive a tablet 90, or a screen, distributed by the airline company. Said opening has a dimension adapted to said tablet.

In the embodiment described in FIGS. 2, 3, 5 to 7 and 9, said opening for receiving the tablet is a through opening, i.e., the opening is formed across the thickness of the plate 11. Such a through opening configuration has the advantage of reducing the weight of the support.

The plate 11 of the support 10 may comprise elements 114 for reversible holding of the tablet in the opening 113 of the plate 11. The tablet may comprise holding elements complementary to the holding elements 114 of the plate.

In a non-limiting example of the invention, the holding elements 114 are magnets.

Advantageously, the tablet 90 comprises connection means complementary to the connector 13 of the support 10.

In one embodiment, to add in holding of the support 10 on the backrest 52, complementary to the clamping mechanisms 12, the support 10 comprises two reversible fastening elements 18, each fastening element linking a lower part of the plate 11 to the free end 123 of a leg bearing on a lateral portion 551 of the peripheral frame. Such fastening elements allow ensuring that the lower part of the plate 11 remains well pressed against the backrest 52, and does not separate, in particular due to the vibrations in the aircraft. In one embodiment, the fastening elements are flexible fastening elements such as textile straps with loops and hooks (straps of the Velcro® type), which fit to the complex geometry and to the variations of thickness of the uncovered backrest.

In one embodiment, when the plate 11 of the support 10 comprises an opening 113 for a tablet 90, the support 10 comprises, within the thickness of the plate 11, at least one chimney 19 extending from said opening towards a periphery of the plate, preferably towards the upper part of the plate 11, as illustrated in FIGS. 3 and 4. The at least one chimney 19 allows ensuring the circulation of air and an evacuation of the hot air out of the support 10.

To advantageously reduce the weight of the support 10, the plate and the casings are perforated for example, as illustrated in FIGS. 2 to 10.

Preferably, the plate 11, the casings 15 and the clamping mechanisms 12 of the support 10 are made of an aluminum material. Of course, the invention is not limited to the aluminum material but could also be carried out in other materials, such as a composite material.

Once the support 10 is set in place on the backrest 52, the backrest is covered again.

An elastically-compressible foam-based padding block 60, for example made of polyurethane, is placed at the front face 521 of the backrest 52, said padding block overmolding the structural framework 55 and the support 10 at its front face.

Afterwards, a slipcover 70, with a suitable dimension, advantageously covers the padding block 60 and the support 10 and is fastened, in a conventional manner, on the backrest 52, like existing slipcovers, for example via textile straps with loops and hooks (such as Velcro® straps).

Advantageously, the slipcover 70 entirely covers the support 10, which becomes invisible to the passengers.

In the embodiment where the plate 11 of the support 10 comprises an opening 151 for receiving the tablet 90, the slipcover 70 partially covers the support 10, leaving only said opening apparent.

Preferably, the slipcover is made of a mesh fabric, in particular to enable the evacuation of hot air originating from the tablet 90, when it is installed in the opening 113 of the plate 11 of the support 10, and flowing in at least one chimney 19.

Preferably, the slipcover 70 comprises a glazed area (not represented in the figures), opposite the transparent glazed portion 144 of the protective case 14 and the opening 151, whether glazed or not, of the casing 15, in order not to hinder the transmission/reception of the first and second signals between the two communication devices.

The installation of the slipcover of the seat ensures a long-lasting use of the support. It reduces the risk of deterioration, vandalism, theft, and ensures a visual harmony compliant with current seats that are not equipped with a screen or with seats originally equipped with a screen.

The seat located to the right in FIG. 1 comprises the support 10 installed on the upper part of the backrest. There are also represented the adapted padding block 60 and slipcover 70 (shown by a dotted line). For comparison, there is also represented the padding block and the slipcover of the backrest, when the support is not installed.

In this figure, it is clearly shown that the support 10 forms a continuation of the upper part 523 of the backrest 52 of the seat.

The support has many advantages, described hereinafter in a non-exhaustive manner.

When installed on the seat, the support has a reduced bulk, in terms of height (in order not to hide the instructions), of width (substantially the same width as the width of the seat) and of depth (in order not to hinder the passage, in particular for safety reasons in case of evacuation).

When installed on the seat, in addition to offering access to entertainment data and/or Internet data to the passenger located behind the seat, the support creates a headrest for the person sitting on the seat.

The support advantageously allows the passengers to have access to entertainment data and/or Internet data, with their personal electronic equipment, in a determined privileged space, around his/her seat, via the Li-Fi technology. By privileged space, it should be understood a unique and personal connection space enabling a passenger to receive and/or send data internal and/or external to the aircraft in a secure and customised manner in a predetermined physical location, in this instance his/her seat. The passenger enjoys a unique and personal connection space to receive and transmit data in a confidential manner.

The support allows equipping a conventional seat that is not provided with an onboard entertainment system IFE, or equipping a seat provided with an onboard entertainment system with an obsolete screen, and also allows connecting the personal equipment of the passengers.

Equipping a seat with such a support may have be economically interesting for the company operating the aircraft rather than replacing all seats equipped with an obsolete screen with new seats equipped with a new-generation screen.

Mounting the support on the seat by means of a simple clamping does not deteriorate the seat. Thus, the support can be removed depending on the needs of operation of the aircraft to return to the original configuration, or to future evolutions.

The installation of the support by means of the setting mechanisms is quick and could adapt to different types and sizes of seats.

The invention claimed is:

1. A support configured to be reversibly installed at an upper part of an uncovered backrest of a seat, comprising:
   a plate, configured to bear, totally or partially, against a rear face of the backrest;
   three clamping mechanisms, each clamping mechanism comprising a bearing member and a clamping screw configured to cooperate with the plate to clamp a structural framework of the backrest between the bearing member and the plate;
   a Li-Fi data communicator connected to the plate; and
   a connector configured to connect to the Li-Fi data communicator by a cable and configured to connect an electronic equipment.

2. The support of claim 1, wherein the bearing member of at least one clamping mechanism is in a form of a longitudinal leg having a hook-like shape at a free end of the longitudinal leg.

3. The support of claim 2, further comprising two reversible fasteners, each fastener linking a lower part of the plate to the free end of the longitudinal leg.

4. The support of claim 1, wherein the plate comprises an opening configured to receive the electronic equipment.

5. The support of claim 4, wherein the plate comprises holding elements to reversibly hold the electronic equipment in the opening of the plate.

6. The support of claim 5, wherein the holding elements are magnets.

7. The support of claim 4, further comprising, within a thickness of the plate, at least one chimney extending from the opening towards a periphery of the plate.

8. The support of claim 1, wherein the Li-Fi data communicator comprises a transmitter and a receiver disposed in a protective case, the protective case comprising a glazed portion opposite the transmitter and the receiver.

9. The support of claim 8, wherein the protective case is secured to the plate by a ball-joint connection.

10. The support of claim 8, further comprising a casing to receive the Li-Fi data communicator, the casing being fixedly secured to the plate.

11. A seat comprising a backrest equipped with the support of claim 1, with a padding block and with a slipcover covering the padding block and the support, the slipcover comprising a glazed area.

* * * * *